(12) United States Patent
Chen et al.

(10) Patent No.: US 11,145,080 B2
(45) Date of Patent: Oct. 12, 2021

(54) METHOD AND APPARATUS FOR THREE-DIMENSIONAL OBJECT POSE ESTIMATION, DEVICE AND STORAGE MEDIUM

(71) Applicant: BAIDU ONLINE NETWORK TECHNOLOGY (BEIJING) CO., LTD., Beijing (CN)

(72) Inventors: Sili Chen, Beijing (CN); Yuan Lin, Beijing (CN); Yongjie Zhang, Beijing (CN)

(73) Assignee: BAIDU ONLINE NETWORK TECHNOLOGY (BEIJING) CO., LTD.

( * ) Notice: Subject to any disclaimer, the term of this patent is extended or adjusted under 35 U.S.C. 154(b) by 132 days.

(21) Appl. No.: 16/508,372

(22) Filed: Jul. 11, 2019

(65) Prior Publication Data
US 2019/0333242 A1 Oct. 31, 2019

(30) Foreign Application Priority Data
Aug. 3, 2018 (CN) .......................... 201810880310.5

(51) Int. Cl.
*G06T 7/73* (2017.01)
*G06T 7/246* (2017.01)
*G06K 9/00* (2006.01)

(52) U.S. Cl.
CPC ............ *G06T 7/73* (2017.01); *G06K 9/00214* (2013.01); *G06K 9/00744* (2013.01);
(Continued)

(58) Field of Classification Search
None
See application file for complete search history.

(56) References Cited

U.S. PATENT DOCUMENTS 8,948,450 B2 * 2/2015 Hampel ................. G06T 7/254
382/103
10,203,209 B2 * 2/2019 Roumeliotis ......... H04W 4/026
(Continued)

FOREIGN PATENT DOCUMENTS

| CN | 101763636 A | 6/2010 |
| CN | 102656595 A | 9/2012 |

(Continued)

OTHER PUBLICATIONS

Lee, Gim Hee, Friedrich Fraundorfer, and Marc Pollefeys. "Structure-less pose-graph loop-closure with a multi-camera system on a self-driving car." 2013 IEEE/RSJ International Conference on Intelligent Robots and Systems. IEEE, 2013. (Year: 2013).*

(Continued)

*Primary Examiner* — Michelle M Entezari
(74) *Attorney, Agent, or Firm* — Dilworth IP, LLC (57) ABSTRACT

The present application provides a method and an apparatus for three-dimensional object pose estimation, a device and a storage medium. The method includes: calculating a graph of a previous frame and a graph of a current frame for a target three-dimensional object; performing a matching calculation on the graph of the previous frame and the graph of the current frame using a graph matching algorithm to obtain a vertex correspondence relationship between the graph of the previous frame and the graph of the current frame; calculating a pose of the target three-dimensional object in the current frame according to the vertex correspondence relationship, a pose of the target three-dimensional object in the previous frame and a PnP algorithm. The matching accuracy of feature points is effectively improved, and thereby the accuracy of three-dimensional object pose estimation is improved.

9 Claims, 4 Drawing Sheets

(52) U.S. Cl.
CPC .... *G06T 7/246* (2017.01); *G06T 2207/10016* (2013.01); *G06T 2207/30244* (2013.01)

(56) References Cited

U.S. PATENT DOCUMENTS

| | | | |
|---|---|---|---|
| 10,380,763 B2* | 8/2019 | Levinshtein | G06T 7/75 |
| 10,460,156 B2* | 10/2019 | Usikov | G06T 7/254 |
| 10,580,140 B2* | 3/2020 | Baruch | G06T 7/194 |
| 10,719,953 B1* | 7/2020 | Ye | G06T 7/73 |
| 2010/0111417 A1* | 5/2010 | Ward | G06T 7/579 382/173 |
| 2011/0293165 A1* | 12/2011 | Malon | G06K 9/00 382/133 |
| 2015/0172626 A1* | 6/2015 | Martini | G06K 9/46 348/50 |
| 2015/0269734 A1* | 9/2015 | Lee | G06K 9/00798 382/103 |
| 2016/0071278 A1* | 3/2016 | Leonard | G06T 7/579 348/47 |
| 2016/0195388 A1* | 7/2016 | D'Agostino | G01B 11/2755 33/228 |
| 2017/0249776 A1* | 8/2017 | Cao | G06T 7/75 |
| 2018/0137644 A1* | 5/2018 | Rad | G06K 9/00208 |
| 2018/0247429 A1* | 8/2018 | Chandraker | G05D 1/0253 |
| 2018/0365483 A1* | 12/2018 | Nakagome | G06K 9/00248 |
| 2019/0325089 A1* | 10/2019 | Golparvar-Fard | G06F 3/04815 |

FOREIGN PATENT DOCUMENTS

| | | |
|---|---|---|
| CN | 104463108 A | 3/2015 |
| CN | 108345821 A | 7/2018 |
| WO | 2007102537 A1 | 9/2007 |

OTHER PUBLICATIONS

Caetano, T. S., McAuley, J. J., Cheng, L., Le, Q. V., & Smola, A. J. (2009). Learning graph matching. IEEE transactions on pattern analysis and machine intelligence, 31(6), 1048-1058. (Year: 2009).*

Hodan, Tomas, Daniel Barath, and Jiri Matas. "Epos: Estimating 6d pose of objects with symmetries." In Proceedings of the IEEE/CVF conference on computer vision and pattern recognition, pp. 11703-11712. 2020. (Year: 2020).*

Yin, P., Ye, J., Lin, G., & Wu, Q. (2021). Graph neural network for 6D object pose estimation. Knowledge-Based Systems, 218, 106839. (Year: 2021).*

Yang, Liu, "Research on Object Recognition Technology in 3D Point Cloud Scene," China Master's thesis Full-text Database Information Technology Series, Chapter 3, Oct. 31, 2016.

First Office Action issued in CN Patent Application No. 201810880310.5 dated Apr. 29, 2020.

* cited by examiner

METHOD AND APPARATUS FOR THREE-DIMENSIONAL OBJECT POSE ESTIMATION, DEVICE AND STORAGE MEDIUM

CROSS-REFERENCE TO RELATED APPLICATIONS

The present disclosure claims priority to Chinese application No. 201810880310.5, filed on Aug. 3, 2018, which is incorporated by reference in its entirety.

TECHNICAL FIELD

The embodiments of the present application relate to the field of video and image processing technologies, and in particular, to a method and an apparatus for three-dimensional object pose estimation, a device and a storage medium.

BACKGROUND

As the technology of video capturing devices becomes mature, video has been adopted as a means of information recording and analysis in more and more fields. It is a basis for further analysis of a three-dimensional object to determine the position and pose of the three-dimensional object in images in a large number of videos and perform continuous tracking and pose estimation.

In the prior art, feature point matching is combined with a perspective n-point algorithm (PnP algorithm for short) to determine an initial pose of a three-dimensional object, and feature point tracking is combined with the PnP algorithm to estimate the pose of the target three-dimensional object in each subsequent frame.

However, the method of three-dimensional object pose estimation in the prior art is less effective for the pose estimation of the three-dimensional object with weak texture or repeating texture, because a problem of mismatch of feature points between two frames may occur. Even if a random sample consensus algorithm (RANSAC algorithm for short) is used to remove the incorrect matching points, it is also possible to obtain an incorrect pose estimation result because the number of incorrect matching points is much larger than the number of the correct matching points.

SUMMARY

The embodiments of the present application provide a method and an apparatus for three-dimensional object pose estimation, a device and a storage medium, which solve the technical problem of poor estimation effect of the method for three-dimensional object pose estimation in the prior art on a three-dimensional object with weak texture or repeating texture.

A first aspect of the embodiments of the present application provides a method for three-dimensional object pose estimation, including: calculating a graph of a previous frame and a graph of a current frame of a target three-dimensional object; performing a matching calculation on the graph of the previous frame and the graph of the graph of the current frame using a graph matching algorithm to obtain a vertex correspondence relationship between the graph of the previous frame and the graph of the current frame; and calculating a current frame pose of the target three-dimensional object according to the vertex correspondence relationship, a previous frame pose of the target three-dimensional object and a PnP algorithm.

A second aspect of the embodiments of the present application provides an pose estimation apparatus for a three-dimensional object, including: a graph image calculating module, configured to calculate a previous frame graph image and a current frame graph image of a target three-dimensional object; a graph matching calculating module, configured to perform a matching calculation on the graph of the previous frame and the graph of the current frame using a graph matching algorithm to obtain a vertex correspondence relationship between the graph of the previous frame and the graph of the current frame; a current frame pose calculating module, configured to calculate a current frame pose of the target three-dimensional object according to the vertex correspondence relationship, a previous frame pose of the target three-dimensional object and a PnP algorithm.

A third aspect of the embodiments of the present application provides a terminal device, including: one or more processors; a memory, configured to store one or more programs; when the one or more programs are executed by the one or more processors, the one or more processors is caused to implement the method of the first aspect described above.

A fourth aspect of the embodiments of the present application provides a computer readable storage medium having a computer program stored thereon, and the program is executed by the processor to implement the method of the first aspect described above.

Based on the above aspects, the embodiments of the present application calculate a graph of a previous frame and a graph of a current frame for a target three-dimensional object; perform a matching calculation on the graph of the previous frame and the graph of the current frame using a graph matching algorithm to obtain a vertex correspondence relationship between the graph of the previous frame and the graph of the current frame; and calculate a pose of the target three-dimensional object on the current frame according to the vertex correspondence relationship, a pose of the target three-dimensional object in the previous frame and a PnP algorithm. Since the correspondence relationship of feature points is determined by determining the vertex correspondence relationship between the graph of the previous frame and the graph of the current frame using the graph matching algorithm, and the graph matching algorithm has a good feature point matching effect on the three-dimensional object with weak texture or repeating texture, the matching accuracy of feature points is effectively improved and thereby the accuracy of three-dimensional object pose estimation is improved.

It is to be understood that contents described in the summary of the present disclosure are not intended to limit key or important features of embodiments of the present application, nor the scope of the application. Other features of the present application will be readily understood by the following description.

DESCRIPTION OF EMBODIMENTS

The embodiments of the present application will be described in more detail below with reference to the appended drawings. Although certain embodiments of the present application are shown in the drawings, it should be understood that the present application may be embodied in a variety of forms and should not be construed as limited to the embodiments set forth herein. Instead, these embodiments are provided for a more thorough and complete understanding of the present application. It should be understood that the drawings and embodiments of the present application are for illustrative purpose only and are not intended to limit the protection scope of the present application.

Terms "first", "second", "third", "fourth" and the like (if any) in the description, claims and drawings described above of the embodiments of the present application are used to distinguish similar objects, rather than describing a specific order or sequence. It should be understood that data used in this way is interchangeable where appropriate so that the embodiments of the disclosure described herein can be implemented in a sequence other than those illustrated or described herein. Moreover, terms "including", "comprising" and "having" and any variations thereof are intended to cover a non-exclusive inclusion. For example, a process, method, system, product, or device that includes a series of steps or units is not necessarily limited to those steps or units that are clearly listed, but may include steps or units that are not clearly listed or that are inherent to such process, method, product or device In order to clearly understand the technical solutions of the present application, the terms and algorithms involved in the present application will be explained below:

Graph: In the embodiments of the present application, the graph is used to show a data relationship of a target three-dimensional object. In the graph, a vertex of the graph is used to represent a feature point of the target three-dimensional object, and an edge of the graph is used to represent a relationship between feature points. In the graph, properties of vertices in the graph and the relationship between the vertices will not change no matter how the vertices rotate or move. That is, the changed graph is still the same as the original graph.

Graph Matching Algorithm: An important concept in the graph matching algorithm is the maximum common sub-graph. The maximum common sub-graph refers to the sub-graph that can overlap between graph 1 and graph 2 and has the most nodes. The graph's isomorphism helps to determine whether two objects are the same. Although the graph has many different representations, properties of the graph do not change due to different representations of the graph. The graph matching problem is an NP problem. The graph matching method can be solved by a probability relaxation method, a neural network method, a maximum stream approximation method, etc.

SIFT algorithm: The SIFT algorithm is a scale-invariant feature transform algorithm. It is an algorithm for describing local features of images which is based on a scale space and is stable to graphics scaling, rotation, and affine transformation and illumination changes. In this embodiment, the SIFT algorithm is used to first detect extreme points in the scale space, and then remove low-contrast extreme points and unstable edge extreme points to obtain the feature points.

The embodiments of the present application will be specifically described below with reference to the drawings.

Embodiment I

Figure 1:
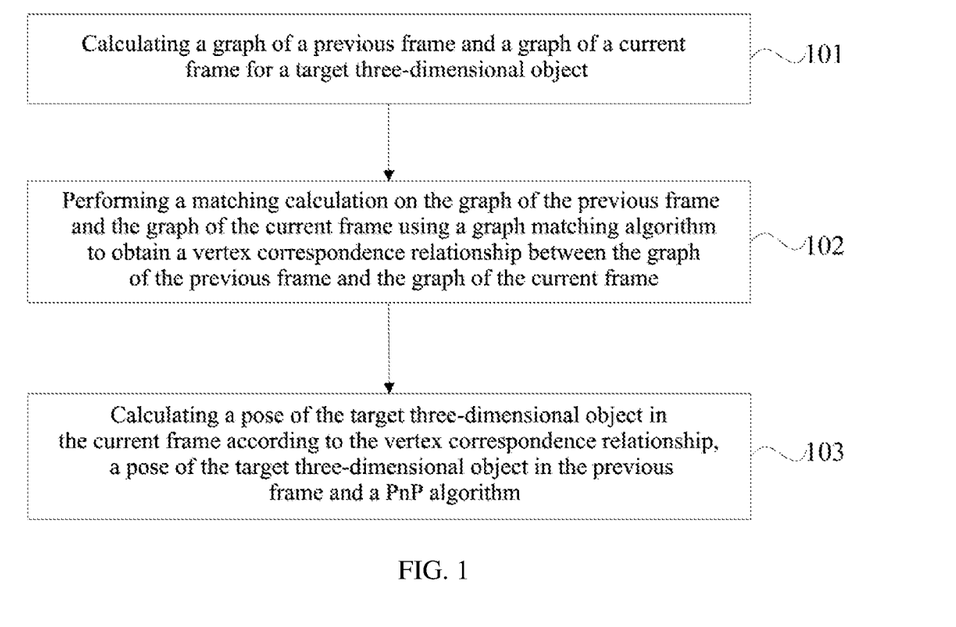
FIG. 1 is a flowchart of a method for three-dimensional object pose estimation according to Embodiment I of the present application.

FIG. 1 is a flowchart of a method for three-dimensional object pose estimation according to Embodiment I of the present application. As shown in FIG. 1, an execution body of the embodiment of the present application is an apparatus for three-dimensional object pose estimation that may be integrated in a terminal device. The terminal device may be a computer, a laptop, a server, a robot, etc. The method for three-dimensional object pose estimation provided by this embodiment includes following steps.

Step 101, calculating a graph of a previous frame and a graph of a current frame for a target three-dimensional object.

Specifically, in this embodiment, a mask image of the target three-dimensional object is obtained from an image of the previous frame first, and then feature points are extracted from the image of the previous frame in a region with a pixel value of 1 in the mask image of the previous frame, and feature points are also extracted from an image of the current frame in the region with the pixel value of 1 in the mask image of the previous frame. Adjacent feature points extracted from the image of the previous frame are connected, and a weight of each edge is calculated to form a graph of the previous frame. Adjacent feature points extracted from the image of the current frame are connected, and a weight of each edge is calculated to form a graph of the current frame.

In this embodiment, for the region projected by the target three-dimensional object in the mask image, the pixel value of the pixel in the mask image is 1, for the region not projected by the target three-dimensional object, the pixel value of the pixel in the mask image is 0.

In this embodiment, the weight of each edge may be an average value of response values of two feature points corresponding to the edge, and may be other values representing the two feature points, which is not limited in this embodiment.

In this embodiment, the SIFT algorithm may be used for extracting feature points in the image of the previous frame and the image of the current frame, and other feature extraction algorithms may be selected, which is not limited in this embodiment.

Step 102, performing a matching calculation on the graph of the previous frame and the graph of the current frame using a graph matching algorithm to obtain a vertex correspondence relationship between the graph of the previous frame and the graph of the current frame.

Specifically, in this embodiment, the graph of the previous frame and the graph of the current frame are input into a model of the graph matching algorithm, and the graph matching algorithm performs a matching calculation on the graph of the previous frame and the graph of the current frame, with a vertex correspondence relationship between the graph of the previous frame and the graph of the current frame being output.

Step 103, calculating a pose of the target three-dimensional object in the current frame according to the vertex correspondence relationship, a pose of the target three-dimensional object in the previous frame and a PnP algorithm.

Specifically, in this embodiment, the vertex correspondence relationship between the graph of the previous frame and the graph of the current frame is obtained, and the pose information of the target three-dimensional object in the previous frame is obtained. The vertex correspondence relationship between the graph of the previous frame and the graph of the current frame, and the pose information of the target three-dimensional object in the previous frame are input into a model corresponding to the PnP algorithm to calculate the pose of the target three-dimensional object in the current frame according to the vertex correspondence relationship between the graph of the previous frame and the graph of the current frame and the pose information of the target three-dimensional object in the previous frame, and output the pose of the target three-dimensional object in the current frame.

The method for three-dimensional object pose estimation provided by the present embodiment calculates a graph of a previous frame and a graph of a current frame for the target three-dimensional object, performs a matching calculation on the graph of the previous frame and the graph of the current frame using a graph matching algorithm to obtain a vertex correspondence relationship between the graph of the previous frame and the graph of the current frame, and calculates a pose of the target three-dimensional object in the current frame according to the vertex correspondence relationship, a pose of the target three-dimensional object in the previous frame and a PnP algorithm. Since the correspondence relationship of feature points is determined by determining the vertex correspondence relationship between the graph of the previous frame and the graph of the current frame using the graph matching algorithm, and the graph matching algorithm has a good feature point matching effect on the three-dimensional object with weak texture or repeating texture, the matching accuracy of feature points is effectively improved, and thereby the accuracy of three-dimensional object pose estimation is improved.

Embodiment II

Figure 2:
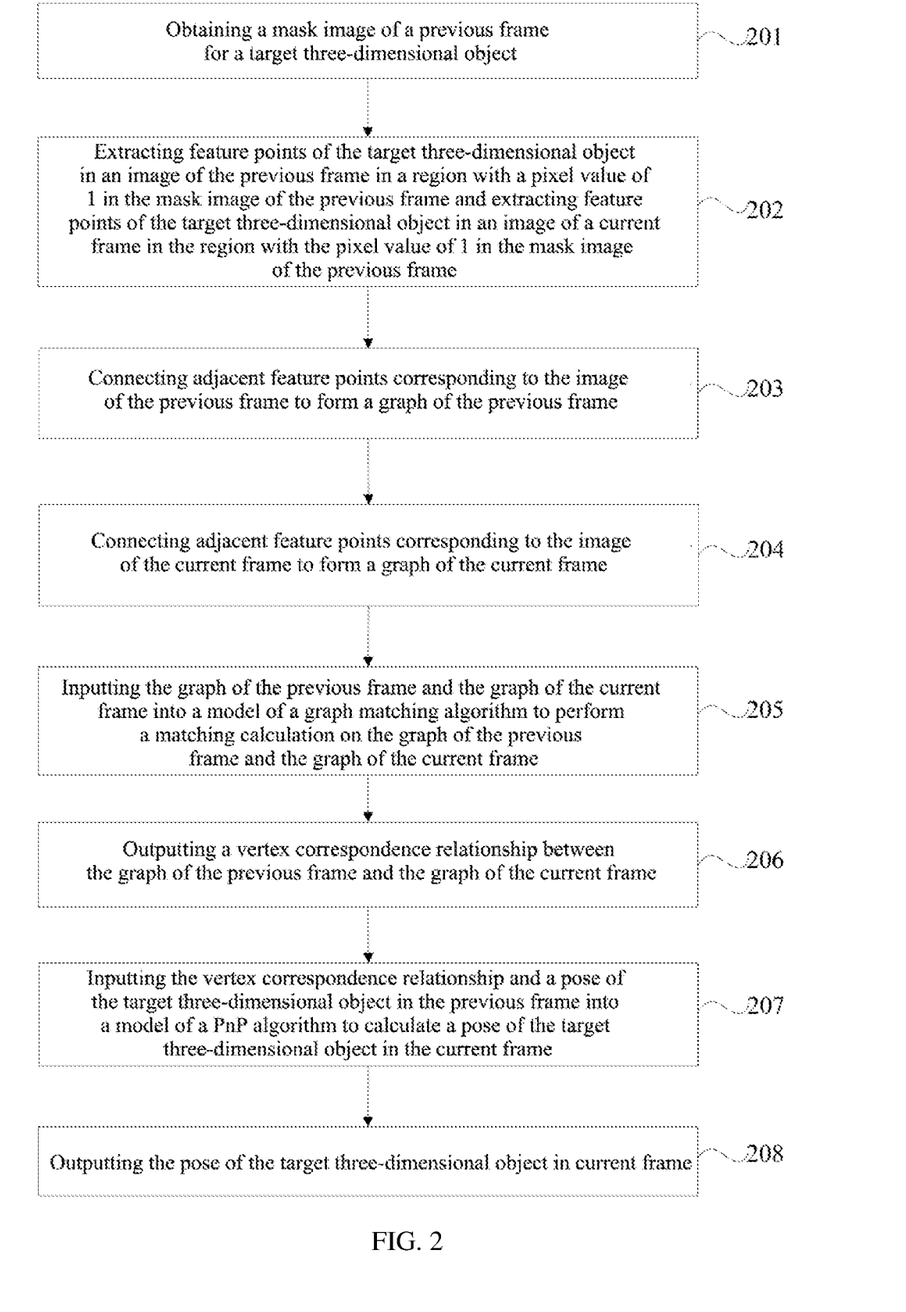
FIG. 2 is a flowchart of a method for three-dimensional object pose estimation according to Embodiment II of the present application.

FIG. 2 is a flowchart of a method for three-dimensional object pose estimation according to Embodiment II of the present application. As shown in FIG. 2, the method for three-dimensional object pose estimation provided in this embodiment is based on the method for three-dimensional object pose estimation provided in Embodiment I of the present application and further defines Step 101 to Step 103. Then the method for three-dimensional object pose estimation provided in this embodiment includes following steps.

Step 201, obtaining a mask image of a previous frame for a target three-dimensional object.

Specifically, in this embodiment, an image of a previous frame is obtained first, which contains a target three-dimensional object, and then a model of the target three-dimensional object is projected by using a pose of the target three-dimensional object in the image of the previous frame to obtain a projected image of the previous frame. The target three-dimensional object is rendered in the projected image of the previous frame, a z-buffer image is obtained from the rendering tool and the z-buffer image is binarized to obtain a mask image of the previous frame. In the mask image of the previous frame, the pixel value of the region projected by the target three-dimensional object is 1, and the pixel value of the region not projected by the target three-dimensional object is zero. The z buffer is a technique to perform a "hidden face elimination" work when coloring the target three-dimensional object, such that the part hidden behind the target three-dimensional object will not be displayed.

Step 202, extracting feature points of the target three-dimensional object in an image of the previous frame in a region with the pixel value of 1 in the mask image of the previous frame, and extracting feature points of the target three-dimensional object in an image of a current frame in the region with the pixel value of 1 in the mask image of the previous frame.

Specifically, in this embodiment, after obtaining the mask image of the previous frame, the region with the pixel of 1 in the mask image of the previous frame is a projected region of the target three-dimensional image, so feature points of the target three-dimensional object in the image of the previous frame are extracted from the image of the previous frame covered by the region with the pixel value of 1 in the mask image of the previous frame. In the image of the current frame containing the target three-dimensional object acquired from a camera, the mask image of the previous frame mask image is covered on the image of the current frame image, and feature points of the target three-dimensional object in the image of the current frame are extracted from the current frame image covered by the region with the pixel value of 1 in the mask image of the previous frame.

Further, in this embodiment, extracting feature points of the target three-dimensional object in the image of the previous frame in the region with the pixel value of 1 in the mask image of the previous frame and extracting feature points of the target three-dimensional object in the image of the current frame in the region with the pixel value of 1 in the mask image of the previous frame, includes:

using a SIFT algorithm to extract feature points of the target three-dimensional object in the image of the previous frame in the region with the pixel value of 1 in the mask image of the previous frame, and using the SIFT algorithm to extract feature points of the target three-dimensional object in the image of the current frame in the region with the pixel value of 1 in the mask image of the previous frame.

In this embodiment, the SIFT algorithm is adopted to extract the feature points in the image of the target three-dimensional object, so that the extracted feature points are more robust.

Specifically, when the SIFT algorithm is adopted for target three-dimensional object feature extraction to extract the feature points in the image, extreme point detection is performed on the image from which the feature is extracted, in a scale space, and then low-contrast extreme points and unstable edge extreme points are removed to obtain the feature points.

Step 203, connecting adjacent feature points corresponding to the image of the previous frame to form a graph of the previous frame.

The vertex in the graph of the previous frame is a feature point and the weight of an edge is an average value of the response values of two feature points corresponding to the edge.

Further, in this embodiment, after each feature point of the image of the previous frame is extracted, adjacent feature points are connected, where each feature point is a vertex of the graph of the previous frame, and the edge between two adjacent feature points is the edge of the graph of the previous frame. The weight of the edge in the graph of the previous frame is the average value of response values of the two feature points corresponding to the edge.

Step 204, connecting adjacent feature points corresponding to the image of the current frame to form a graph of the current frame.

The vertex in the graph of the current frame is a feature point and the weight of an edge is an average value of the response values of two feature points corresponding to the edge.

Further, in this embodiment, after each feature point of the image of the current frame is extracted, adjacent feature points are connected, where each feature point is a vertex of the graph of the current frame, and the edge between two adjacent feature points is the edge of the graph of the current frame. The weight of the edge in the graph of the current frame is the average value of the response values of the two feature points corresponding to the edge.

It should be noted that in this embodiment, Step 201 to Step 204 are further refinement of Step 101 of the method for three-dimensional object pose estimation provided by Embodiment I of the present application.

Step 205, inputting the graph of the previous frame and the graph of the current frame into a model of a graph matching algorithm to perform a matching calculation on the graph of the previous frame and the graph of the current frame.

Step 206, outputting a vertex correspondence relationship between the graph of the previous frame and the graph of the current frame.

Further, in this embodiment, Step 205 to Step 206 are further refinement of Step 102 of the method for three-dimensional object pose estimation provided by Embodiment I of the present application.

Specifically, the graph of the previous frame and the graph of the current frame are input into the model of the graph matching algorithm to perform a matching calculation on the graph of the previous frame and the graph of the current frame using the graph matching algorithm. After the matching calculation, the correspondence relationship between vertices in the graph of the previous frame and the graph of the current frame is obtained and output.

The correspondence relationship between vertices in the graph of the previous frame and the graph of the current frame is the correspondence relationship between feature points of the target three-dimensional object in the graph of the previous frame and the graph of the current frame.

Step 207, inputting the vertex correspondence relationship and a pose of the target three-dimensional object in the previous frame into a model of a PnP algorithm to calculate a pose of the target three-dimensional object in the current frame.

Step 208, outputting the pose of the target three-dimensional object in the current frame.

Further, in this embodiment, the correspondence relationship between vertices in the graph of the previous frame and the graph of the current frame as well as the pose of the target three-dimensional object in the previous frame are input into the model of the PnP algorithm, to calculate the pose of the target three-dimensional object in the current frame according to the correspondence relationship between vertices in the graph of the previous frame and the graph of the current frame as well as the pose of the target three-dimensional object in the previous frame by using the PnP algorithm. The pose of the target three-dimensional object in the current frame is output after it is calculated.

The method for three-dimensional object pose estimation provided by this embodiment obtains a mask image of a previous frame for a target three-dimensional object when calculating a graph of the previous frame and a graph of a current frame for the target three-dimensional object, extracts feature points of the target three-dimensional object in an image of the previous frame in a region with a pixel value of 1 in the mask image of the previous frame and extracts feature points of the target three-dimensional object in the image of the current frame in the region with the pixel value of 1 in the mask image of the previous frame, connects adjacent feature points corresponding to the image of the previous frame to form the graph of the previous frame, and connects adjacent feature points corresponding to the image of the current frame to form the graph of the current frame. Since feature points extracted by the SIFT algorithm are more robust, the calculated graph of the previous frame and the graph of the current frame for the target three-dimensional object are more accurate, thus the correspondence relationship of feature points will be more accurate while it is determined by using the graph matching algorithm to determine the vertex correspondence relationship between the graph of the previous frame and the graph of the current frame, thereby further improving the accuracy of three-dimensional object pose estimation.

Embodiment III

Figure 3:
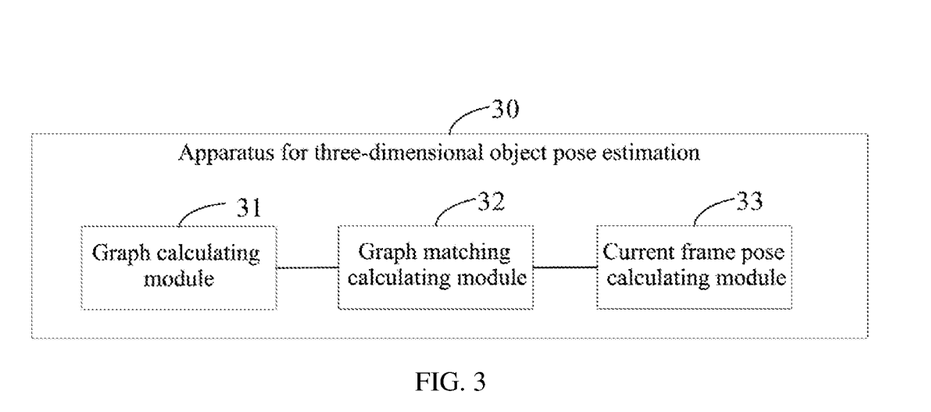
FIG. 3 is a schematic structural diagram of an apparatus for three-dimensional object pose estimation according to Embodiment III of the present application.

FIG. 3 is a schematic structural diagram of an apparatus for three-dimensional object pose estimation according to Embodiment III of the present application. As shown in FIG. 3, the apparatus for three-dimensional object pose estimation 30 provided by this embodiment includes: a graph calculating module 31, a graph matching calculating module 32, and a current frame pose calculating module 33.

The graph image calculating module 31 is configured to calculate a graph of a previous frame and a graph of a current frame for a target three-dimensional object. The graph matching calculating module 32 is configured to perform a matching calculation on the graph of the previous frame and the graph of the current frame by using a graph matching algorithm to obtain a vertex correspondence relationship between the graph of the previous frame and the graph of the current frame. The current frame pose calculating module 33 is configured to calculate a pose of the target three-dimensional object in the current frame according to the vertex correspondence relationship, a pose of the target three-dimensional object in the previous frame and a PnP algorithm.

The apparatus for three-dimensional object pose estimation provided in this embodiment can perform the technical solution of the method embodiment shown in FIG. 1, and the implementation principle and technical effects thereof are similar, which will not be repeated herein.

Embodiment IV

Figure 4:
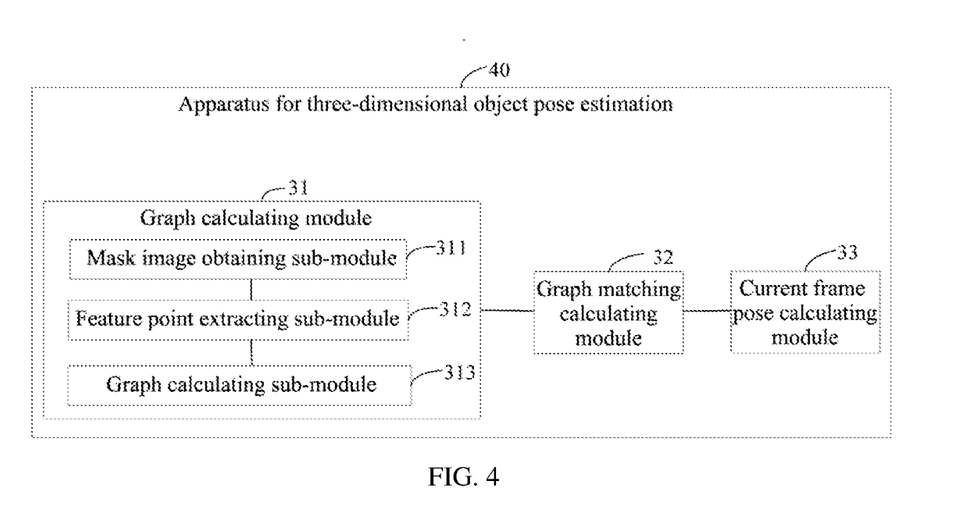
FIG. 4 is a schematic structural diagram of an apparatus for three-dimensional object pose estimation according to Embodiment IV of the present application.

FIG. 4 is a schematic structural diagram of an apparatus for three-dimensional object pose estimation according to Embodiment IV of the present application. As shown in FIG. 4, based on the apparatus for three-dimensional object pose estimation 30 provided in Embodiment III, the apparatus for three-dimensional object pose estimation 40 provided in this embodiment further includes the following features.

Further, the graph calculating module 31 includes a mask image obtaining sub-module 311, a feature point extracting sub-module 312, and a graph calculating sub-module 313.

Further, the mask image obtaining sub-module 311 is configured to obtain a mask image of the previous frame for the target three-dimensional object. The feature point extracting sub-module 312 is configured to extract feature points of the target three-dimensional object in the image of the previous frame in a region with a pixel value of 1 in the mask image of the previous frame and extract feature points of the target three-dimensional object in the image of the current frame in the region with the pixel value of 1 in the mask image of the previous frame. The graph calculating sub-module 313 is configured to connect adjacent feature points corresponding to the image of the previous frame to form the graph of the previous frame, and connect adjacent feature points corresponding to the image of the current frame to form the graph of the current frame. The vertices in the graph of the previous frame and the graph of the current frame are feature points, and the weight of an edge is an average value of response values of two feature points corresponding to the edge.

Further, the feature point extracting sub-module 312 is specifically configured to: use the SIFT algorithm to extract the feature points of the target three-dimensional object in the image of the previous frame in the region with the pixel value of 1 in the mask image of the previous frame, and use the SIFT algorithm to extract the feature points of the target three-dimensional object in the image of the current frame in the region with the pixel value of 1 in the mask image of the previous frame.

Further, the graph matching calculating module 32 is specifically configured to: input the graph of the previous frame and the graph of the current frame into a model of the graph matching algorithm to perform the matching calculation on the graph of the previous frame and the graph of the current frame; output the vertex correspondence relationship between the graph of the previous frame and the graph of the current frame.

Further, the current frame pose calculating module 33 is specifically configured to: input the vertex correspondence relationship, the pose of the target three-dimensional object in the previous frame into a model of the PnP algorithm to calculate the pose of the target three-dimensional object in the current frame; output the pose of the target three-dimensional object in the current frame.

The apparatus for three-dimensional object pose estimation provided in this embodiment can perform the technical solutions of the method embodiment shown in FIG. 2, and the implementation principle and the technical effects thereof are similar, which will not be repeated herein.

Embodiment V

Figure 5:
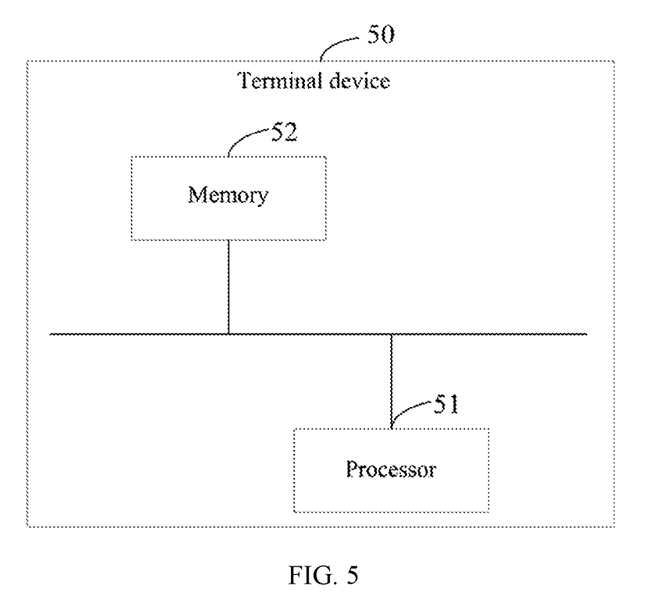
FIG. 5 is a schematic structural diagram of a terminal device according to Embodiment V of the present application.

FIG. 5 is a schematic structural diagram of a terminal device according to Embodiment V of the present application. As shown in FIG. 5, the terminal device provided in this embodiment includes: one or more processors 51 and a memory 52.

The memory 52 is configured to store one or more programs. When the one or more programs are executed by the one or more processors, the one or more processors are caused to implement the method for the three-dimensional object pose estimation provided by Embodiment I of the present application or the method for three-dimensional object pose estimation provided by Embodiment II of the present application.

The related description can be understood by referring to the related descriptions and effects corresponding to the steps in FIG. 1 to FIG. 2, which will not be repeated herein.

In this embodiment, the processor 51 and the memory 52 are connected by a bus.

Embodiment VI

The embodiment of the present application further provides a computer readable storage medium having a computer program stored thereon, and the computer program is executed by a processor to implement the method for three-dimensional object pose estimation provided by Embodiment I of the present application or the method for three-dimensional object pose estimation provided by Embodiment II of the present application.

The computer readable storage medium provided in this embodiment calculates a graph of a previous frame and a graph of a current frame for the target three-dimensional object, performs a matching calculation on the graph of the previous frame and the graph of the current frame by using a graph matching algorithm to obtain a vertex correspondence relationship between the graph of the previous frame and the graph of the current frame, and calculates a pose of the target three-dimensional object in the current frame according to the vertex correspondence relationship, a pose of the target three-dimensional object in the previous frame and a PnP algorithm. Since the correspondence relationship of feature points is determined by determining the vertex correspondence relationship between the graph of the previous frame and the graph of the current frame using the graph matching algorithm, and the graph matching algorithm has a good feature point matching effect on the three-dimensional object with weak texture or repeating texture, the matching accuracy of feature points is effectively improved, and thereby the accuracy of three-dimensional object pose estimation is improved.

In the several embodiments provided by the present application, it should be understood that the disclosed apparatus and method may be implemented in other manners. For example, the apparatus embodiments described above are merely illustrative. For example, the division of the module is only a logical function division, and there may be another division manner in actual implementation; for example, multiple modules or components may be combined or may be integrated into another system, or some features can be ignored or not be executed. In addition, the mutual coupling or direct coupling or communication connection shown or discussed may be an indirect coupling or communication connection through some interfaces, devices or units, and may be in an electrical, mechanical or other form.

The module described as a separate component may or may not be physically separated, and the component displayed as a module may or may not be a physical module, that is, may be located in one place, or may be distributed to multiple network modules. Some or all the modules may be selected as required, to achieve the purpose of the solution of the embodiment.

In addition, each functional module in each embodiment of the present disclosure may be integrated into one processing module, or each module may exist physically separately, or two or more modules may be integrated into one module. The above integrated module can be implemented in the form of hardware or in the form of hardware plus software functional modules.

The program codes for implementing the methods of the present application can be written in any combination of one or more programming languages. Such program codes may be provided to a general computer, a dedicated computer or a processor or controller of other programmable data processing apparatus, such that when the program code is executed by the processor or controller, the functions/operations specified in the flowcharts and/or block diagrams are caused to be implemented. The program codes may be completely or partly executed on a machine, as a stand-alone software package, it is partly executed on the machine and partly executed on a remote machine, or entirely executed on the remote machine or a server.

In the context of the present application, a machine readable medium can be a tangible medium that can contain or store a program for use by an instruction execution system, apparatus, or device, or for use in conjunction with the instruction execution system, apparatus, or device. The machine readable medium can be a machine readable signal medium or a machine readable storage medium. A machine readable medium can include, but not limited to, an electronic, magnetic, optical, electromagnetic, infrared, or semiconductor system, apparatus, or device, or any suitable combination of the foregoing. More specific examples of the machine readable storage medium may include electrical connection based on one or more wires, a portable computer disk, a hard disk, a random access memory (RAM), a read only memory (ROM), an erasable programmable read only memory (EPROM or a flash memory), optical fiber, a compact disk read only memory (CD-ROM), an optical storage device, a magnetic storage device, or any suitable combination of the foregoing.

In addition, although the operations are depicted in a particular order, this should be understood that such operations are required to be performed in the shown particular order or in the sequence order, or that all illustrated operations are required to be performed to achieve the desired results. Multitasking and parallel processing may be advantageous in certain circumstances. Likewise, although several specific implementation details are included in the above discussion, these should not be construed as limiting the scope of the disclosure. Certain features that are described in the context of separate embodiment can also be implemented in combination in a single implementation. Conversely, various features that are described in the context of a single implementation can be implemented in a plurality of implementations, either individually or in any suitable subcombination.

Although the subject has been described in language specific to structural features and/or methodological acts, it is understood that the subject defined in the appended claims is not necessarily limited to the specific features or acts described above. Instead, the specific features and acts described above are merely exemplary forms for implementing the claims.

What is claimed is:

1. A method for three-dimensional object pose estimation, comprising:
   calculating a graph of a previous frame and a graph of a current frame for a target three-dimensional object;
   performing a matching calculation on the graph of the previous frame and the graph of the current frame by using a graph matching algorithm to obtain a vertex correspondence relationship between the graph of the previous frame and the graph of the current frame;
   calculating a pose of the target three-dimensional object in the current frame according to the vertex correspondence relationship, a pose of the target three-dimensional object in the previous frame and a perspective n-point (PnP) algorithm;
   wherein the calculating a graph of a previous frame and a graph of a current frame for the target three-dimensional object, comprises:
   obtaining a mask image of the previous frame for the target three-dimensional object;
   extracting feature points of the target three-dimensional object in an image of the previous frame in a region with a pixel value of 1 in the mask image of the previous frame, and extracting the feature points of the target three-dimensional object in an image of the current frame in the region with the pixel value of 1 in the mask image of the previous frame;
   connecting adjacent feature points corresponding to the image of the previous frame to form the graph of the previous frame;
   connecting adjacent feature points corresponding to the image of the current frame to form the graph of the current frame;
   wherein vertices in the graph of the previous frame and the graph of the current frame are the feature points, and a weight of an edge is an average value of response values of two feature points corresponding to the edge.

2. The method of claim 1, wherein the extracting feature points of the target three-dimensional object in an image of the previous frame in a region with a pixel value of 1 in the mask image of the previous frame, and extracting the feature points of the target three-dimensional object in an image of the current frame in the region with the pixel value of 1 in the mask image of the previous frame, comprises:
   using a SIFT algorithm to extract the feature points of the target three-dimensional object in the previous frame image in the region with the pixel value of 1 in the mask image of the previous frame, and using the SIFT algorithm to extract the feature points of the target three-dimensional object in the current frame image in the region with the pixel value of 1 in the mask image of the previous frame.

3. The method of claim 1, wherein the performing a matching calculation on the graph of the previous frame and the graph of the current frame using a graph matching algorithm to obtain a vertex correspondence relationship between the graph of the previous frame and the graph of the current frame, comprises:
   inputting the graph of the previous frame and the graph of the current frame into a model of the graph matching algorithm to perform the matching calculation on the graph of the previous frame and the graph of the current frame;
   outputting the vertex correspondence relationship between the graph of the previous frame and the graph of the current frame.

4. The method of claim 1, wherein the calculating a pose of the target three-dimensional object in the current frame according to the vertex correspondence relationship, a pose of the target three-dimensional object in the previous frame and a PnP algorithm, comprises:
   inputting the vertex correspondence relationship and the pose of the target three-dimensional object in the previous frame into a model of the PnP algorithm to calculate the pose of the target three-dimensional object in the current frame;
   outputting the pose of the target three-dimensional object in the current frame.

5. A terminal device, comprising:
one or more processors;
a memory, configured to store one or more programs;
wherein when the one or more programs are executed by the one or more processors, the one or more processors are caused to:
calculate a graph of a previous frame and a graph of a current frame for a target three-dimensional object;
perform a matching calculation on the graph of the previous frame and the graph of the current frame by using a graph matching algorithm to obtain a vertex correspondence relationship between the graph of the previous frame and the graph of the current frame;
calculate a pose of the target three-dimensional object in the current frame according to the vertex correspondence relationship, a pose of the target three-dimensional object in the previous frame and a perspective n-point (PnP) algorithm;
wherein the one or more processors are further caused to:
obtain a mask image of the previous frame for the target three-dimensional object;
extract feature points of the target three-dimensional object in the image of the previous frame in a region with a pixel value of 1 in the mask image of the previous frame, and extract the feature points of the target three-dimensional object in the image of the current frame in the region with the pixel value of 1 in the mask image of the previous frame;
connect adjacent feature points corresponding to the image of the previous frame to form the graph of the previous frame, and connect adjacent feature points corresponding to the image of the current frame to form the graph of the current frame;
wherein vertices in the graph of the previous frame and the graph of the current frame are feature points, and a weight of an edge is an average value of response values of two feature points corresponding to the edge.

6. The terminal device of claim 5, wherein the one or more processors are further caused to:
use a SIFT algorithm to extract the feature points of target three-dimensional object in the image of the previous frame in the region with the pixel value of 1 in the mask image of the previous frame, and use the SIFT algorithm to extract the feature points of the target three-dimensional object in the image of the current frame in the region with the pixel value of 1 in the mask image of the previous frame.

7. The terminal device of claim 5, wherein the one or more processors are further caused to:
input the graph of the previous frame and the graph of the current frame into a model of the graph matching algorithm to perform the matching calculation on the graph of the previous frame and the graph of the current frame; output the vertex correspondence relationship between the graph of the previous frame and the graph of the current frame.

8. The terminal device of claim 5, wherein the one or more processors are further caused to:
input the vertex correspondence relationship and the pose of the target three-dimensional object in the previous frame into a model of the PnP algorithm to calculate the pose of the target three-dimensional object in the current frame; output the pose of the target three-dimensional object in the current frame.

9. A non-transitory computer readable storage medium having a computer program stored thereon, wherein the program is executed by a processor to implement the method of claim 1.

* * * * *